United States Patent
Begole et al.

(10) Patent No.: US 9,754,240 B2
(45) Date of Patent: Sep. 5, 2017

(54) METHOD FOR QUICKLY RECOVERING FROM TASK INTERRUPTION

(75) Inventors: James M. A. Begole, Los Altos, CA (US); Oliver Brdiczka, Mountain View, CA (US); Norman Makato Su, Irvine, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 2094 days.

(21) Appl. No.: 12/623,015

(22) Filed: Nov. 20, 2009

(65) Prior Publication Data

US 2011/0126050 A1    May 26, 2011

(51) Int. Cl.
*G06Q 10/10* (2012.01)
*G06F 9/48* (2006.01)
*G06F 9/44* (2006.01)

(52) U.S. Cl.
CPC .............. *G06Q 10/10* (2013.01); *G06F 9/485* (2013.01); *G06F 9/4443* (2013.01)

(58) Field of Classification Search
USPC .................................................. 705/7
See application file for complete search history.

(56) References Cited

U.S. PATENT DOCUMENTS

| | | | | |
|---|---|---|---|---|
| 4,145,735 A * | 3/1979 | Soga | ..................... | G06F 9/4837 710/264 |
| 5,708,820 A * | 1/1998 | Park | ......................... | G06F 1/30 713/323 |
| 5,805,910 A * | 9/1998 | Lee | ........................ | G06F 1/3215 307/66 |
| 5,809,223 A * | 9/1998 | Lee | ............................ | G06F 1/30 714/4.5 |
| 5,963,219 A * | 10/1999 | Choi | ........................ | G06F 1/30 345/501 |
| 5,987,621 A * | 11/1999 | Duso et al. | ................... | 714/4.11 |
| 6,182,086 B1 * | 1/2001 | Lomet et al. | | |
| 6,209,088 B1 * | 3/2001 | Reneris | ................. | G06F 1/3203 713/1 |
| 6,449,618 B1 * | 9/2002 | Blott | ................. | G06F 17/30516 |
| 6,496,944 B1 * | 12/2002 | Hsiao et al. | .................... | 714/15 |
| 7,664,249 B2 * | 2/2010 | Horvitz | ............... | H04L 12/2602 370/254 |
| 7,689,521 B2 * | 3/2010 | Nodelman | ........... | G06Q 10/109 706/21 |
| 7,743,340 B2 * | 6/2010 | Horvitz | ................ | G05B 19/404 715/710 |
| 7,797,267 B2 * | 9/2010 | Horvitz | .................. | G06Q 10/04 706/21 |
| 7,844,666 B2 * | 11/2010 | Horvitz | ................ | G06Q 10/107 709/206 |

(Continued)

*Primary Examiner* — Leland Marcus
(74) *Attorney, Agent, or Firm* — Shun Yao; Park, Vaughan, Fleming & Dowler LLP (57) ABSTRACT

One embodiment of the present invention provides a system for assisting a user in recovering from a task interruption. During operation, the system records the user's activity while the user is performing a task, and detects an interruption to the task. Upon the detection of the interruption, the system transfers to a storage the recorded user activities during a predetermined time period before the interruption. The system presents a visual representation of the recorded activities to the user, thereby assisting the user in recovering from the task interruption.

19 Claims, 10 Drawing Sheets

(56) References Cited

U.S. PATENT DOCUMENTS

| | | | | |
|---|---|---|---|---|
| 7,975,015 B2* | 7/2011 | Horvitz | ................ | G06Q 10/107 |
| | | | | 709/203 |
| 8,024,415 B2* | 9/2011 | Horvitz | ................ | G05B 19/404 |
| | | | | 709/206 |
| 8,631,419 B2* | 1/2014 | Horvitz | ................... | G06F 9/485 |
| | | | | 719/318 |
| 2002/0015064 A1* | 2/2002 | Robotham | ............ | G06F 3/0481 |
| | | | | 715/863 |
| 2002/0087649 A1* | 7/2002 | Horvitz | ................ | G06Q 10/107 |
| | | | | 709/207 |
| 2003/0088831 A1* | 5/2003 | Bauer | ............... | G06F 17/30011 |
| | | | | 715/809 |
| 2003/0100347 A1* | 5/2003 | Okada | ..................... | A63F 13/10 |
| | | | | 455/567 |
| 2003/0167454 A1* | 9/2003 | Iordanov | ................ | G09B 23/28 |
| | | | | 717/104 |
| 2006/0048025 A1* | 3/2006 | Filipovic | ............ | G05B 23/0264 |
| | | | | 714/724 |
| 2007/0011314 A1* | 1/2007 | Horvitz | ................ | G06Q 10/107 |
| | | | | 709/224 |
| 2007/0271504 A1* | 11/2007 | Horvitz | ................ | G06Q 10/107 |
| | | | | 715/236 |
| 2008/0172406 A1* | 7/2008 | Takeda et al. | ................ | 707/102 |
| 2008/0304807 A1* | 12/2008 | Johnson | ............ | G06F 17/30787 |
| | | | | 386/278 |
| 2009/0006574 A1* | 1/2009 | Horvitz | ................... | G06F 9/485 |
| | | | | 709/207 |
| 2009/0119385 A1* | 5/2009 | Horvitz | ................ | G06Q 10/107 |
| | | | | 709/207 |
| 2011/0071964 A1* | 3/2011 | Horvitz | ................ | G06N 99/005 |
| | | | | 706/12 |
| 2012/0190459 A1* | 7/2012 | Kobayashi | ............ | A63F 13/493 |
| | | | | 463/43 |

\* cited by examiner

METHOD FOR QUICKLY RECOVERING FROM TASK INTERRUPTION

BACKGROUND

Field

This disclosure is generally related to task management. More specifically, this disclosure is related to a method for assisting a user in recovering from task interruption.

Related Art

Modern-day workers often found themselves juggling multiple tasks and activities. Sometimes, they have to switch between tasks, or return to a previously worked-on task after an unanticipated interruption. All these task switches can happen very rapidly.

As the worker's to-do list gets longer, it becomes increasingly difficult for a worker to remember the current stage of a task or an activity when he experiences an interruption. For example, a worker may be working on multiple tasks simultaneously, with multiple windows open on his desktop computer, when he is interrupted by an incoming phone call. After answering the phone call, during which the worker has to open another window on his computer to deal with a question from a colleague regarding a different task, the worker tries to return to his previous task. However, the worker may have a difficult time recalling which task he was working on previously as more than one window remains open on his computer. Even if the worker remembers which task he was working on and activates the correct window, he may still find it hard to resume his previous work, because he may have forgotten the precise step he was working on. For instance, if the worker was reviewing a document, he may forget which paragraph he just reviewed. To resume his reviewing activity, he may have to reread the document to find the place he left off. Such a process can be time consuming, thus leading to decreased daily productivity.

Several approaches have been proposed in the past. However, most approaches require manual input for task management, and are, thus, inefficient and inconvenient.

SUMMARY

One embodiment of the present invention provides a system for assisting a user in recovering from a task interruption. During operation, the system records the user's activity while the user is performing a task, and detects an interruption to the task. Upon the detection of the interruption, the system transfers to a storage the recorded user activities during a predetermined time period before the interruption. The system presents a visual representation of the recorded activities to the user, thereby assisting the user in recovering from the task interruption.

In a variation on this embodiment, the system extracts a sequence of significant events during a predetermined time period before the interruption.

In a further variation, the visual representation includes a replay of the sequence of significant events.

In a variation on this embodiment, the system buffers the recording in a temporary buffer with a predetermined depth, thereby allowing newly recorded user activities to dequeue previously recorded user activities.

In a variation on this embodiment, the system detects the interruption by at least one of: detecting the user answering an incoming phone call, detecting the user replying to an incoming instant message (IM), detecting the user answering an incoming email, detecting the presence of a visitor, and detecting the user switching to a new task.

In a variation on this embodiment, presenting a visual representation of the user's activities includes presenting a series of screenshots, thereby illustrating the user's desktop activities occurring before the interruption.

In a further variation, the system allows the user to define a granularity of the screenshots.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for assisting a worker in recovering from an interrupted task. The system continuously records a worker's activity, and automatically detects interruptions to the task. In response to an interruption, the system saves the recorded working activities over a period of time right before the interruption.

After the worker returns from the interruption, the system presents a visual representation of the worker's activities before the interruption to the worker in order to help the worker recover from the interruption.

Interruption Detection

Interruptions have been shown to decrease work productivity. When a worker is engaged in a task, an unplanned interruption can cause the worker to disengage from the current task to attend to the event triggering the interruption. After the interrupting task has been completed (for example, when the phone call ends or the visitor leaves the office), the worker is assumed to be able to resume his previous task immediately. However, sometimes the worker may fail to resume his original task immediately. Embodiments of the present invention provide a system for assisting a worker in recovering from an interrupted task. The system continuously records a worker's activity, and automatically detects interruptions to the task. In response to an interruption, the system saves the recorded working activities over a period of time right before the interruption. After the worker returns from the interruption, the system presents a visual representation of the worker's activities before the interruption to the worker in order to help the worker recover from the interruption.

It has been shown that the process of task recovery involves not only a physical reorientation, such as visual re-acquisition of the original task, but also memory for important state information, such as where one left off and what to do next. When it is time to resume a previously executed task, a worker often needs to recall the next action to be taken before proceeding with it. If the worker fails to recall the next action, he may need to find a way to reconstruct what he was doing and where he left off when the interruption occurred. Sometimes, the worker may need to repeat steps prior to the interruption. For example, a document reviewer, failing to pinpoint the place he left off may have to reread several paragraphs he reviewed previously. Hence, an automated system that detects disruption and later presents the worker a sequence of activities happening before the interruption can assist the worker's effort in task recovery.

In addition to unscheduled interruptions, sometimes a worker may also experience a scheduled interruption. For example, during a day's work, the user may sometimes need to suspend a current task to attend a meeting. Or a worker may switch from one task to another due to scheduling needs. In addition, a worker may simply get distracted from his current task.

It has been shown that unplanned task interruptions are often initiated by communication, such as an incoming phone call, an incoming email, an incoming instant message (IM), and a human visitor. Various methods can be used to detect these interruptions.

Figure 1:
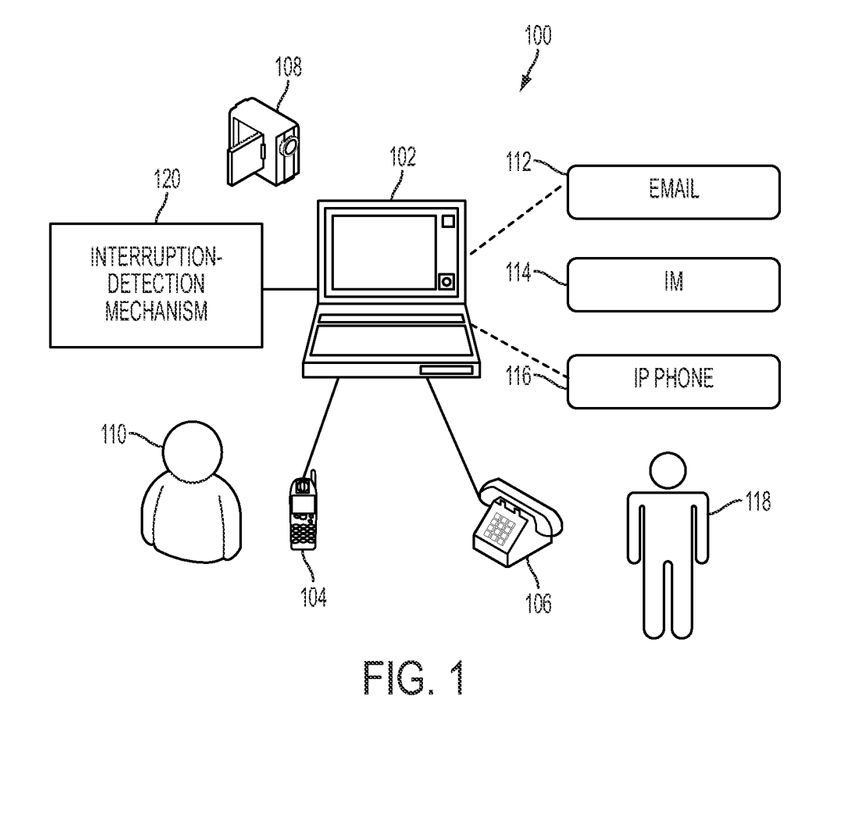
FIG. 1 presents a diagram illustrating an interruption-detection system in accordance with an embodiment of the present invention.

FIG. 1 presents a diagram illustrating an interruption-detection system in accordance with an embodiment of the present invention. Interruption-detection system 100 includes a computing device 102, a number of communication devices associated with a user 110, such as a mobile phone 104, a landline telephone 106, and a camera 108.

Computing device 102 can include any type of devices with computational capability, including, but not limited to: a desktop computer, a digital signal processor, a portable computing device (such as a laptop computer, a smart phone, and a personal digital assistant), a device controller, and a computational engine within an appliance. Camera 108 can be a camera that takes still pictures, or video, or both. In one embodiment, camera 108 is integrated into computing device 102.

A number of communication applications (such as an email application 112, an IM application 114, and an internet protocol (IP) phone application) 16) running on computing device 102 allow user 110 to interact with other people or organizations. Normally, these communication applications are running in the background and prompt user 110 when other people initiate communications with user 110 via these communication applications. For example, when user 110's friend sends him an instant message, IM application 114 running in the background will prompt the user with a flashing icon indicating the arrival of the message. In addition, user 110's colleague may call him on IP phone application 116 generating a ringing tone and/or a flashing icon. User 110 can ignore the incoming communication and continue his current task, or he can suspend his current task to respond to the incoming communication.

Sometimes, to respond to an incoming communication, user 110 may need to switch to a new window on the desktop of computing device 102. For example, user 110 may need to switch to the window for email application 112 in order to reply to an email. Sometimes, user 110 can return to his original task right after responding to the incoming communication. Sometimes, an incoming communication may prompt user 110 to switch to a different task that requires immediate attention. Therefore, user 110 may not be able to return to his original task until much later. Even when user 110 is able to return to his original task right away, changes which have occurred on the desktop of computing device 102 often leave him unclear to where he left off in his original task.

Because most interruptions result from incoming communications, the interruption-detection system can automatically detect interruptions by detecting incoming communications. In some embodiments of the present invention, computing device 102 includes an interruption-detection mechanism 120. During operation, interruption-detection mechanism 120 detects incoming communications, and determines whether user 110 responds to the incoming communication. If so, interruption-detection mechanism 120 determines that an interruption occurs.

In addition to communication applications running on computing device 102 (such as email application 112, IM application 114, and IP phone application 116), interruption-detection mechanism 120 can also detect incoming communications on other communication devices associated with user 110, such as mobile phone 104 and landline telephone 106. In one embodiment, mobile phone 104 and landline telephone 106 are coupled to computing device 102 to allow interruption-detection mechanism 120 to detect their status, such as when user 110 is making a phone call. In one embodiment, interruption-detection mechanism 120 is coupled to a sound detector, which can detect when user 110 is talking on a phone. In addition to being interrupted by communication devices, user 110 may also be interrupted by a visitor 118 stopping by his office to have a face-to-face conversation. Such types of interruption can also be detected by interruption-detection mechanism 120. In one embodiment, interruption-detection mechanism 120 is coupled to camera 108, which detects the presence of visitor 118. In one embodiment, interruption-detection mechanism 120 is coupled to a sound detector, which detects the sound of visitor 118. In one embodiment, the sound detector and/or camera 108 are integrated into mobile phone 104.

In addition to detecting incoming communications, interruption-detection mechanism 120 is also configured to detect task switching that is initiated by user 110. For example, user 110 may suspend his current task and leave his office to attend a meeting. Or user 110 may simply suspend his current task and start working on a different task. In one embodiment, the system can determine that an interruption occurs if the desktop of computing device 102 remains idle for a time period that exceeds a predetermined threshold. In one embodiment, the system classifies the applications or files that user 110 is working on into different clusters, each associated with a particular task. Therefore, when user 110 switches between tasks, he is likely to open a file or an application that belongs to a cluster that is different from his original task. Interruption-detection mechanism 120 can determine which cluster a file opened by user 110 belongs to. If interruption-detection mechanism 120 detects that a newly opened file belongs to a different cluster, interruption-detection mechanism 120 can determine that an interruption has occurred. In one embodiment, the files or applications opened by user 110 are located on a different computing device 102 that is coupled to computing device via a network.

Figure 2:
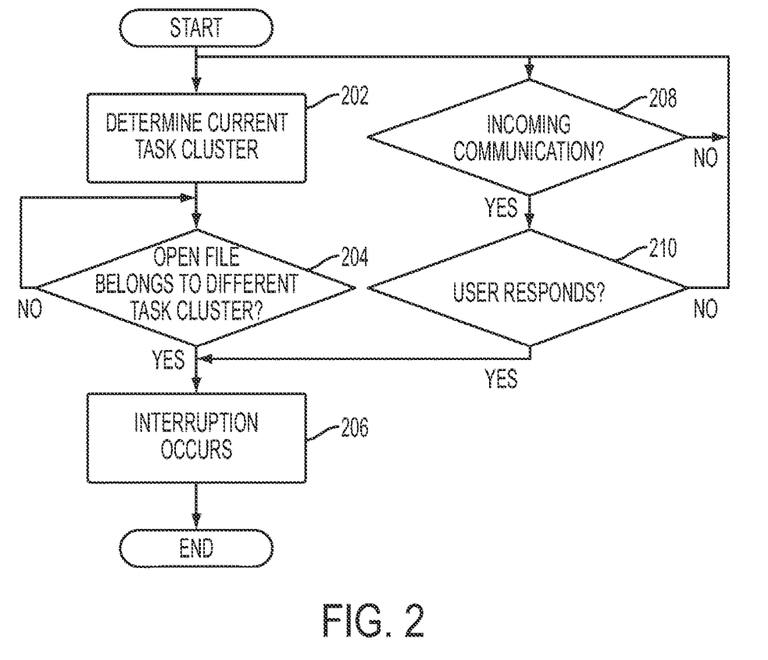
FIG. 2 presents a flow chart illustrating a process of detecting an interruption in accordance with an embodiment of the present invention.

FIG. 2 presents a flow chart illustrating a process of detecting an interruption in accordance with an embodiment of the present invention. During operation, the system determines which task cluster the file/application opened by the user belongs to (operation 202). For example, the user may open a spreadsheet application to edit intercompany finances. The system has previously determined that the spreadsheet application belongs to a task of submitting financial statements. Note that such determination can be done manually or by using a machine-learning technique. Subsequently, the system monitors the user's activity to determine whether the user has opened a file/application that belongs to a different task cluster (operation 204). If so, the system determines that an interruption occurs (operation 206). Otherwise, the system continues to monitor the user's activity (operation 204). The system parallelly determines whether there is an incoming communication (operation 208). If so, the system determines whether the user responds to the incoming communication (operation 210). If so, the system determines that an interruption occurs (operation 206). Otherwise, the system continues to wait for a next incoming communication (operation 208).

Task Replay

Once the system determines that an interruption has occurred, the system can save the current states of the interrupted task, such as the current content of the user's desktop, or the location within a document that the user is reviewing. When the user decides to resume his original task, the system can present a visual representation of the original task showing the user's last actions to help the user recover his original task quickly.

In one embodiment, the visual representation of the suspended task includes snapshots of the states of the task. For example, the system can record a still image of the user's current desktop once the system detects interruption. Such still image can include useful information such as the active window during the time of the interruption. Thus, when the user tries to resume the task, the system presents the user with the still image reminding the user the application he was working on. As a result, the user can reopen the corresponding window to resume his suspended task.

In one embodiment, instead of a snapshot, the system may present the user with a video recording of the user's activity for a certain time period right before the interruption. To do so, the system continuously records the user's activity, including the user's desktop usage and the user's acts within one application or file. For example, when the user is compiling a word processing document, the system continuously records the user's acts including keystrokes (such as typing, cutting and pasting, and deleting) and mouse movements. In one embodiment, the recording is performed by a recording mechanism located on the computing device. In one embodiment, the recording is performed by a camera, which is configured not only to record the user's computer use (such as recording the image of the computer screen, and the user's movement on the mouse and keypad), but also to record the user's non-computer related activity, such as flipping through a book or talking to a visitor. Instead of saving all recordings, which may result in a large amount of memory usage, the system places the recording in a temporary buffer with a predetermined depth. In one embodiment, the buffer is a first-in, first-out (FIFO) queue, and a later recording may dequeue a previous recording in the FIFO buffer. In one embodiment, the system allows the user to select the depth of the FIFO buffer and, thus the duration of the buffered recording.

Once the system detects the occurrence of an interruption, the system then transfers a predetermined amount of content recorded right before the interruption from the temporary buffer to a memory to ensure that this content will not be erased by new recordings. In one embodiment, each time an interruption occurs, the system saves the recording of the time period right before the interruption. When the user decides to resume the original task, the user can request the system to play the saved recording, which illustrates a sequence of the user's activity right before the interruption. Such a replay can effectively revive the user's memory regarding where he left off the task at the interruption.

In one embodiment, instead of replaying a continuous recording of the user's actions for a short period of time, which may be less representative of the user's actions (for example, a five-second recording may be a completely unchanged screenshot), the system extracts a sequence of significant events from a relatively longer time period and replays the significant events to the user using an animated format. For example, a user is interrupted while compiling a large word processing document. Upon detecting the interruption, the system extracts a sequence of significant events happening right before the interruption and transfers them from the temporary FIFO buffer to a memory space. For example, when a user is writing a document, each time a new paragraph is started, or each time the user copies a paragraph or sentence from another file (such as an email), the system considers it a significant event. When the system replays the recording, it can repeatedly replay the transitions between the user's last two or more significant activities. In one embodiment, the transitions between the last activities can be illustrated using an animation technique, in which the snapshots of the two or more activities are illustrated alternately. In one embodiment, the transitions are illustrated by rotating arrows that point at the snapshots of the activities.

Figure 3:
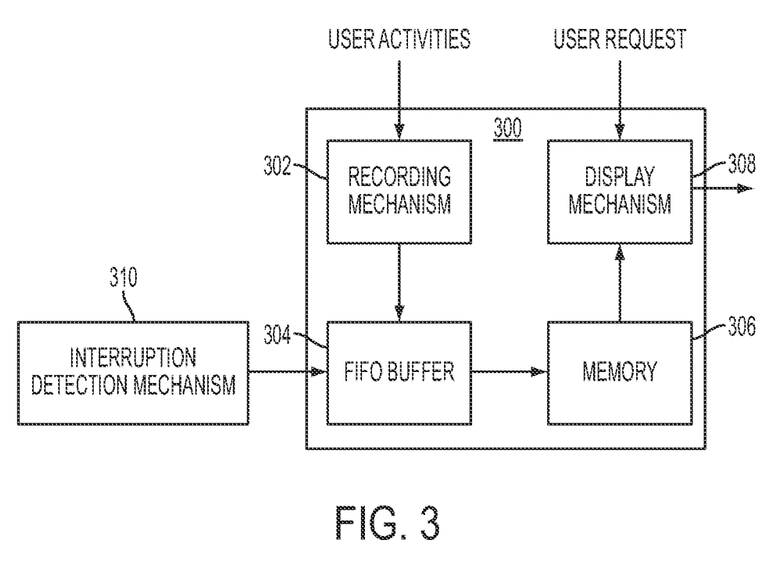
FIG. 3 presents a diagram illustrating the architecture of an exemplary task-recovery system that records, saves, and replays user pre-interruption activities in accordance with an embodiment of the present invention.

FIG. 3 presents a diagram illustrating the architecture of an exemplary task-recovery system that records, saves, and replays user pre-interruption activities in accordance with an embodiment of the present invention. Task-recovery system 300 includes a recording mechanism 302, a FIFO buffer 304, a memory 306, and a display mechanism 308. During operation, recording mechanism 302 continuously records the user's task activities. In one embodiment, recording mechanism 302 resides on the same computing device that the user used to perform his task. In a further embodiment, recording mechanism 302 is a stand-alone camera. The recorded user activities are temporarily stored in a FIFO buffer 304. In one embodiment, FIFO buffer 304 has a predetermined depth, and new recordings continuously flush out old recordings. The amount of user activities that can be stored in FIFO buffer 304 is determined by the predetermined buffer depth. In one embodiment, the buffer depth is defined by the user.

Task-recovery system 300 interfaces with an interruption-detection mechanism 310. Upon interruption-detection mechanism 310 detecting an interruption, either externally driven or internally driven, task-recovery system 300 is configured to transfer the recording of the activities occurring right before the interruption from FIFO buffer 304 to memory 306. In one embodiment, a continuous recording of a certain duration is transferred to memory 306. In one embodiment, to save memory space, task-recovery system 300 extracts significant events from the buffered recording and transfers the extracted recordings to memory 306. In a further embodiment, the system allows the user to define a granularity of the extracted series of significant events. For example, instead of defining the beginning of each new paragraph as a significant event, the user can define the beginning of each new sentence as significant. Sometimes, there might be multiple interruptions as the user switches among multiple tasks; each time an interruption happens, task-recovery system 300 saves the user activities corresponding to the interruption at a different place in memory 306.

When the user is ready to resume his suspended task, the user can request task-recovery system 300 to replay his last task activity. Upon the user's request, display mechanism 308 can present a visual representation of the user's pre-interruption activity to the user. In one embodiment, display mechanism 308 replays a continuous video recording of the user's activity (such as a video showing the screen image of a computing device associated with a user). In one embodiment, display mechanism 308 replays a time-lapse image of the user's computer screen during a time period prior to the interruption. In a further embodiment, display mechanism 308 presents an animation showing the transitions between significant events occurring before an interruption. In cases where multiple interruptions have occurred, display mechanism 308 presents multiple images and/or videos, each associated with an interruption, to allow user to select which one he would like to view in order to recover from a particular interruption.

Note that in one embodiment task-recovery system 300 is located on the same computing device on which the user is performing his task. In a further embodiment, task-recovery system 300 can be located on a separate computer system, such as a centralized server, which couples to the user's task-performing computing device via a network.

Figure 4:
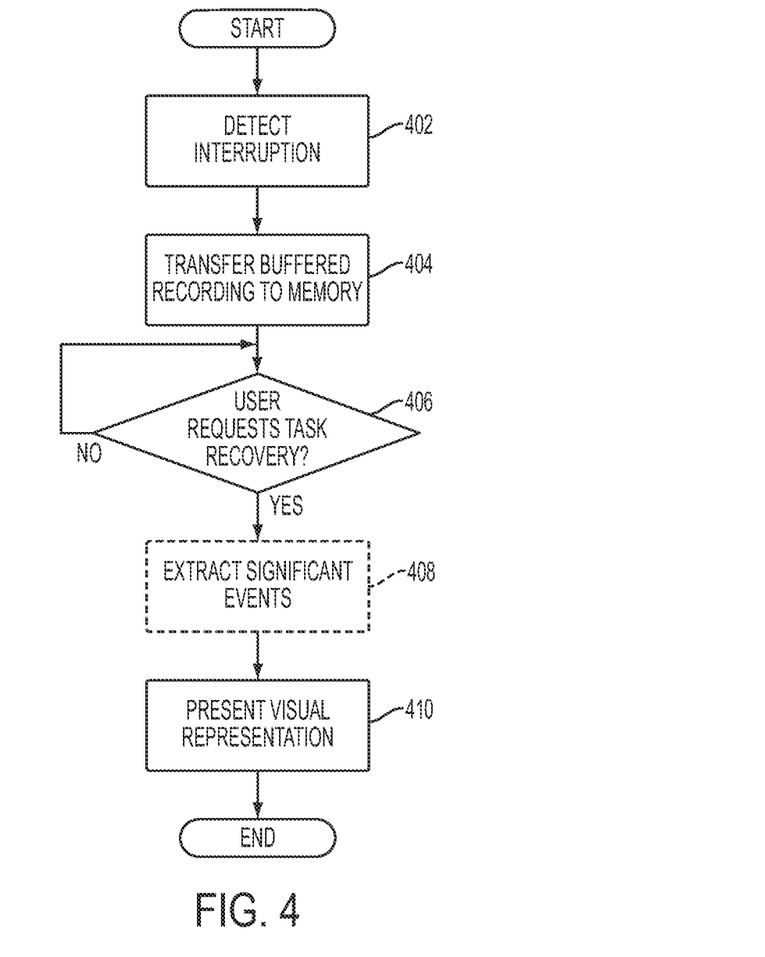
FIG. 4 presents a flow chart illustrating the process of facilitating task recovery in accordance with an embodiment of the present invention.

FIG. 4 presents a flow chart illustrating the process of facilitating task recovery in accordance with an embodiment of the present invention. During operation, the system detects an interruption (operation 402), and transfers a portion of the buffered recording to a memory (operation 404). Subsequently, the system waits for the user to request task recovery (operation 406). In response to the user's request, the system optionally extracts a series of significant events from the buffered recording (operation 408), and presents a visual representation to the user illustrating the user's pre-interruption activities (operation 410).

Figure 5A:
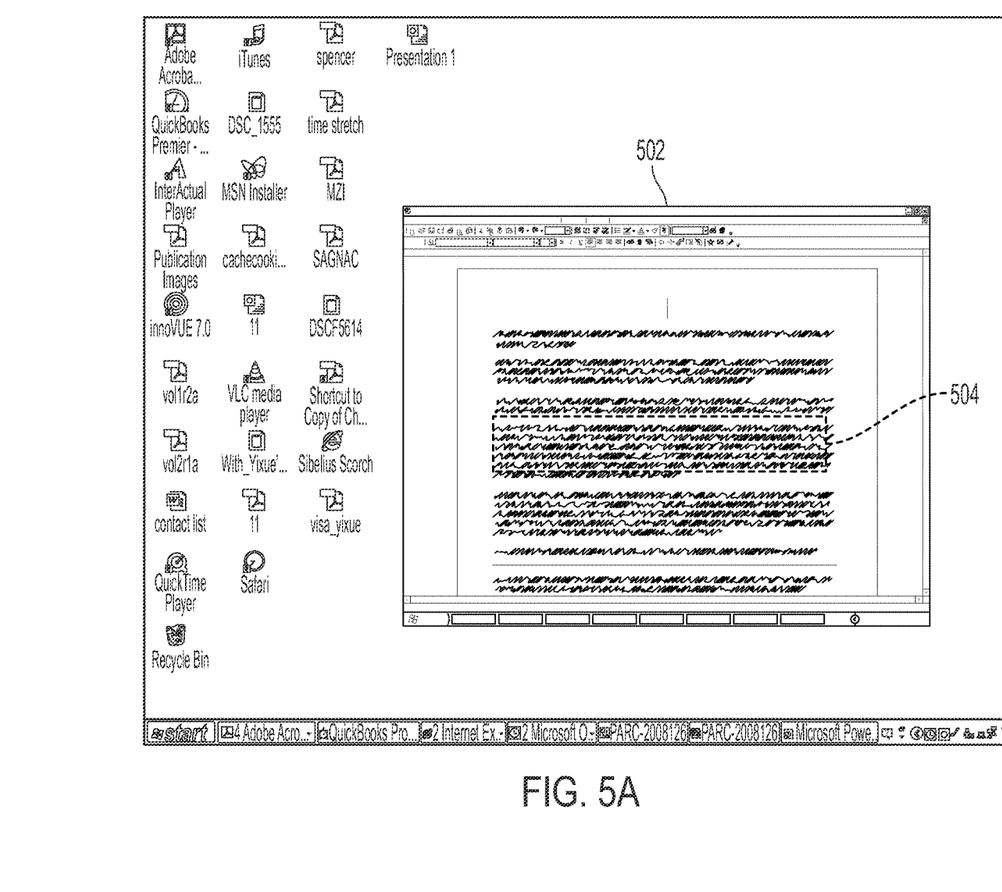
FIGS. 5A and 5B present diagrams illustrating a series of exemplary screenshots presented to a user during task recovery in accordance with an embodiment of the present invention.
Figure 5B:
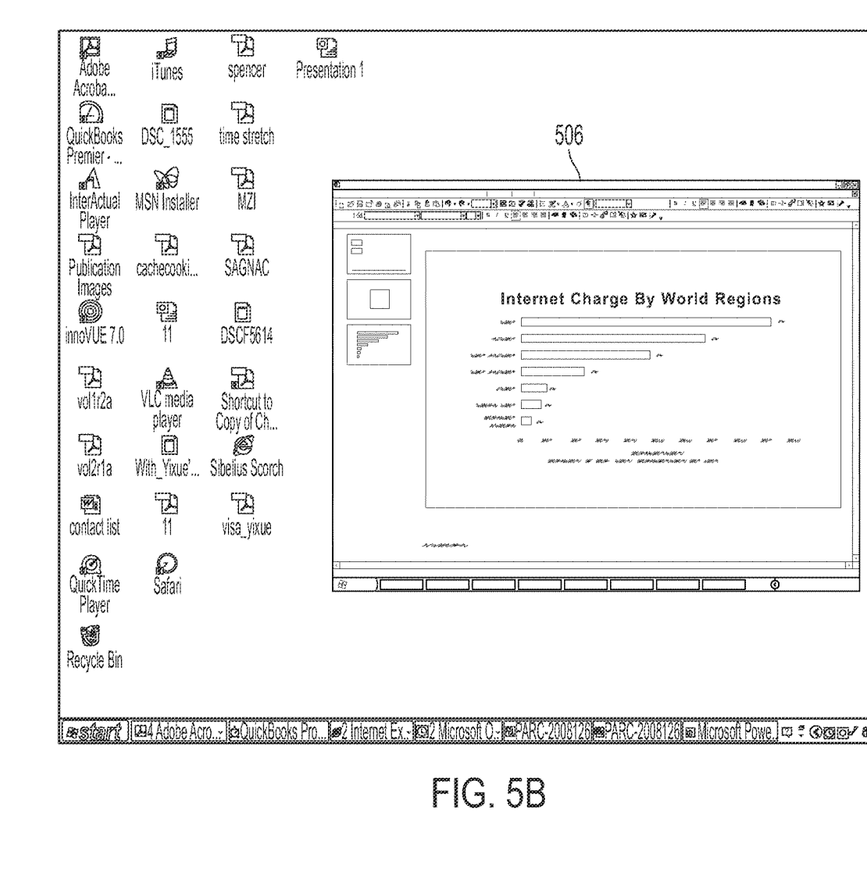

In one embodiment, upon the user's request (such as a keystroke or a mouse click), the system presents the visual representation of the user's pre-interruption activities in the center of the user's computer desktop. FIGS. 5A and 5B present diagrams illustrating a series of exemplary screen shots presented to a user during task recovery in accordance with an embodiment of the present invention. In the example shown in FIGS. 5A and 5B, a user is working on a task that involves writing a document based on a presentation. While performing the task, the user switches between a word-processing application, such as Microsoft® Word (registered trademark of Microsoft Corporation of Redmond, Wash.), and a presentation application, such as PowerPoint® (registered trademark of Microsoft Corporation of Redmond, Wash.), before he is interrupted by a phone call from his boss. To answer an inquiry from his boss, the user has to switch to his email application.

After finishing the phone call ten minutes later, the user wants to resume his original task. To remind himself where he left off in his original task, he opens the task-recovery application, which is running in the background. The task-recovery application has detected the interruption (the phone call), and in response, the task-recovery application transfers portions of recorded user activity to a memory. When the user opens the task-recovery application (such as by clicking an icon in the taskbar), the task-recovery application replays the user's desktop activity occurring before the interruption. In one embodiment, the task-recovery application extracts a series of significant events and replays those events to the user.

FIG. 5A illustrates that the task-recovery application presents the user with a screenshot showing a word-processing window 502 opened by the user before the interruption. In one embodiment, the task-recovery application highlights or uses other marking techniques to mark the paragraph the user was writing (such as paragraph 504) right before the interruption. In a further embodiment, word-processing window 502 can demonstrate a time lapse video showing the detailed activity of the user. FIG. 5B illustrates that the task-recovery application presents the user with a screenshot showing a presentation window 506 opened by the user before the interruption. In one embodiment, presentation window 506 demonstrates the last slide the user was working on before the interruption. To remind the user of the task he was involved in before the interruption, task-recovery application alternately displays word-processing window 502 and presentation window 506 on the desktop of the user's computer.

In FIGS. 5A and 5B, the task-recovery application displays a minified screenshots of the user's desktop in the center of the user's computer desktop. In one embodiment, these screenshots are displayed in their original size, overlaying the user's current desktop. In this example, a flashing button in a corner can indicate that the screen is currently showing an activity replay. To return to his current desktop, the user may need to click a button or press the ESC key.

Figure 6:
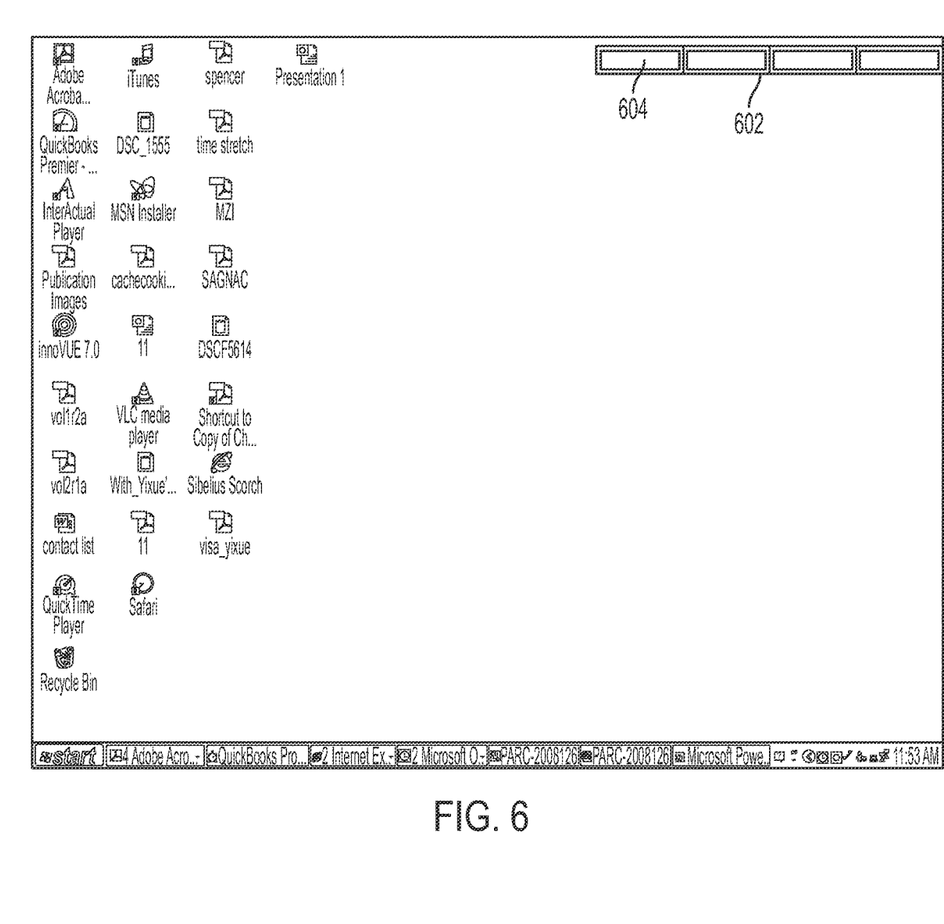
FIG. 6 presents a screenshot of a user's computer desktop illustrating a task-recovery toolbar in accordance with an embodiment of the present invention.

In some embodiments, the task-recovery application can simultaneously present the replay of multiple interruptions to allow a user to select which interruption he would like to view based on which task he would like to resume. FIG. 6 presents a screenshot of a user's computer desktop illustrating a task-recovery toolbar in accordance with an embodiment of the present invention. In the screenshot shown in FIG. 6, a task-recovery toolbar 602 is placed in the upper right corner of the user's computer desktop. Note that the user can drag and place task-recovery toolbar 602 at any place on the computer desktop. Toolbar 602 includes a number of buttons, such as button 604, each representing an interruption. When a user clicks on one of the buttons, the system replays the user's activities occurring before that particular interruption.

Figure 7:
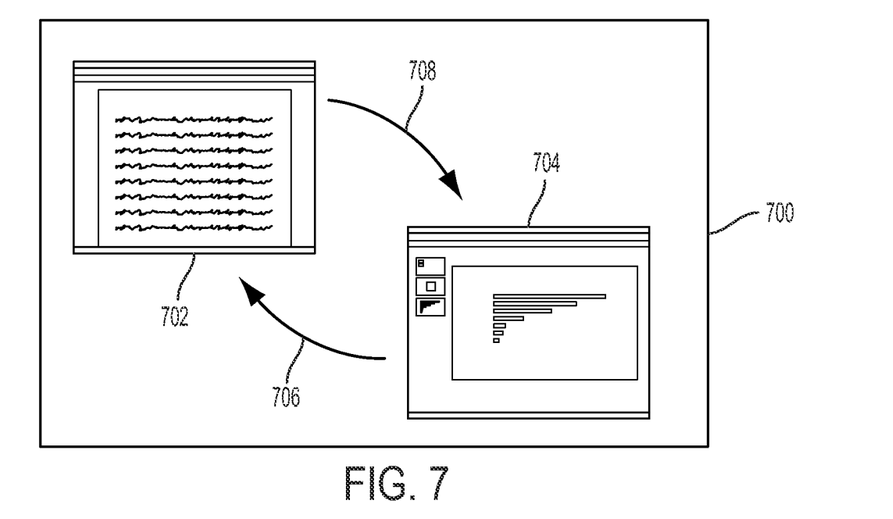
FIG. 7 presents a diagram illustrating an enlarged view of a button in the task-recovery toolbar in accordance with an embodiment of the present invention.

FIG. 7 presents a diagram illustrating an enlarged view of a button in the task-recovery toolbar in accordance with an embodiment of the present invention. In FIG. 7, button 700 illustrates an image showing a word-processing window 702 and a presentation window 704. Arrows 706 and 708 indicate that the user's pre-interruption activity includes switching between window 702 and window 704. Note that, in order to see the details of windows 702 and 704, the user can click button 700, thus causing the task-recovery application to replay the user's detailed activities as shown in FIG. 5.

Figure 8A:
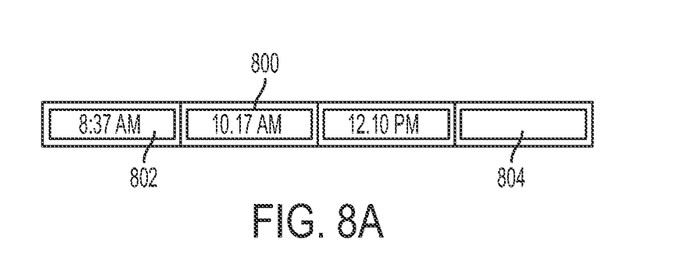
FIG. 8A presents a diagram illustrating a task-recovery toolbar in accordance with an embodiment of the present invention.

To minimize the size of the task-recovery toolbar, in one embodiment, each button is labeled based on the time an interruption occurred. FIG. 8A presents a diagram illustrating a task-recovery toolbar in accordance with an embodiment of the present invention. In FIG. 8A, task-recovery toolbar 800 includes a number of buttons, such as button 802. Each button is labeled with a time indicating when an interruption occurred. For example, button 802 is labeled 8:37 AM, indicating that at 8:37 AM an interruption has occurred. To view the details of that interruption, such as what kind of activities he was engaged in when the interruption happened, the user can click button 802. Upon the user's clicking button 802, the task-recovery application replays the user's detailed activities on the computer desktop as shown in FIG. 5. Note that the number of buttons to be presented in the toolbar can be defined by the user. Unused buttons, such as button 804, are left blank.

Figure 8B:
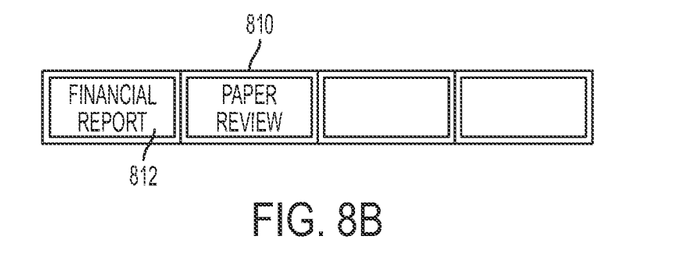
FIG. 8B presents a diagram illustrating a task-recovery toolbar in accordance with an embodiment of the present invention.

In a further embodiment, each button on the task-recovery toolbar is labeled based on the task the user was performing when an interruption occurred. FIG. 8B presents a diagram illustrating a task-recovery toolbar in accordance with an embodiment of the present invention. In FIG. 8B, task-recovery toolbar 810 includes a number of buttons, such as button 812. Each button is labeled with a task name indicating the task the user was performing when an interruption occurred. A user can select which task to resume by clicking a corresponding button. For example, if the user wants to resume his interrupted task of preparing a financial report, he can click button 812 labeled as "financial report." Upon the user's clicking button 812, the task-recovery application replays the user's detailed activities while performing the task of preparing a financial report. The activity replay technique is similar to the one shown in FIG. 5. In one embodiment, the task-recovery system allows the user to select how to label the buttons in the task-recovery toolbar.

Figure 9:
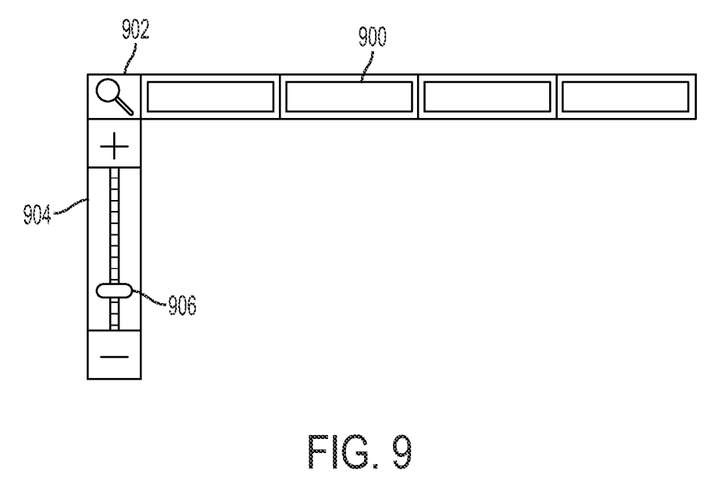
FIG. 9 presents a diagram illustrating a task-recovery toolbar in accordance with an embodiment of the present invention.

In some embodiments, the task-recovery toolbar also includes a zoom button to allow the user to define the granularity of the task replay. FIG. 9 presents a diagram illustrating a task-recovery toolbar in accordance with an embodiment of the present invention. In FIG. 9, task-recovery toolbar 900 includes a zoom button 902. When a user clicks zoom button 902, a drop-down menu 904 appears to allow the user to define the granularity of the activity replay by dragging bar 906 toward the "+" sign or the "−" sign. For example, if the user wants the task-recovery application to extract the significant events and to replay his pre-interruption activities in great detail, such as showing every sentence he typed in a word processing document before the interruption, he can drag bar 906 toward the "+" sign. Similarly, if the user wants the task-recovery application to only show him every paragraph he typed before the interruption, he can drag bar 906 toward the "−" sign. Allowing a user to adjust the granularity of the activity replay can effectively remind the user of his pre-interruption activities. For example, the user can first view his activity in a zoomed out view to recover his memory in terms of which task he was performing. To pinpoint the exact location of where he left off, he can zoom in to his activity right before the interruption. Note that the zoom button and the drop-down menu shown in FIG. 9 are just examples, other graphical user interface (GUI) elements that can facilitate the user making such adjustments, such as a drop-down menu showing a list of pre-defined granularities, are possible.

Figure 10:
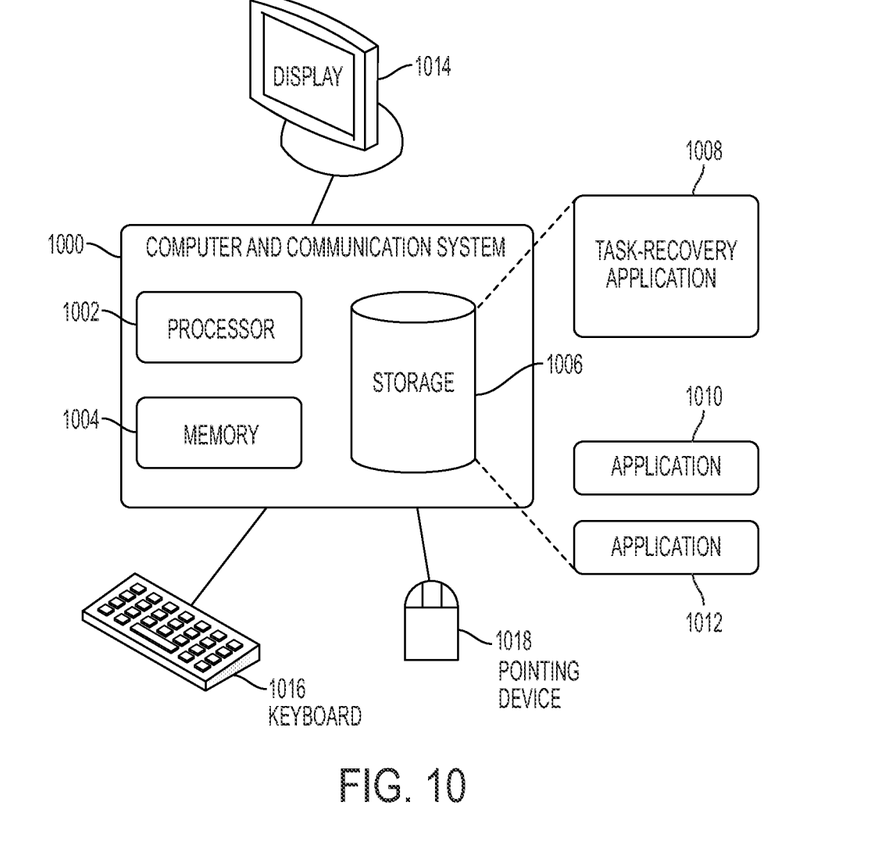
FIG. 10 illustrates an exemplary computer system for facilitating task recovery in accordance with an embodiment of the present invention.

FIG. 10 illustrates an exemplary computer system for facilitating task recovery in accordance with an embodiment of the present invention. In one embodiment, a computer and communication system 1000 includes a processor 1002, a memory 1004, and a storage device 1006. Storage device 1006 stores a task-recovery application 1008, as well as other applications, such as applications 1010 and 1012. During operation, task-recovery application 1008 is loaded from storage device 1006 into memory 1004 and then executed by processor 1002. While executing the program, processor 1002 performs the aforementioned functions. Computer and communication system 1000 is coupled to an optional display 1014, keyboard 1016, and pointing device 1018.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for assisting a user in recovering from a task interruption, the method comprising:
   recording, by one or more sensors associated with a computer, information associated with the user's activities while the user is performing a task;
   in response to determining that the user has suspended a first task, transferring a portion of the recorded user activity information corresponding to a predetermined time period to a storage device associated with the computer; and in response to receiving a task-recovery request from the user after the user has suspended a second task, presenting, on a display associated with the computer, a visual representation associated with at least the first task based on the transferred portion of the activity information to the user.

2. The method of claim 1, further comprising:
extracting a sequence of events during the predetermined time period.

3. The method of claim 2, wherein the visual representation comprises a replay of the sequence of events.

4. The method of claim 1, wherein recording the information associated with the user's activities involves buffering the recorded user activity information in a temporary buffer with a predetermined depth, thereby allowing newly recorded user activity information to dequeue previously recorded user activity information.

5. The method of claim 1, wherein presenting the visual representation associated with at least the first task includes presenting a series of screenshots, thereby illustrating the user's activities during the predetermined time period.

6. The method of claim 5, further comprising allowing the user to define a granularity of the screenshots.

7. A computer-readable storage medium storing instructions that when executed by a computer cause the computer to perform a method for assisting a user in recovering from a task interruption, the method comprising:

recording, by one or more sensors associated with the computer, information associated with the user's activities while the user is performing a task;

in response to determining the user has suspended a first task, transferring a portion of the recorded activity information corresponding to a predetermined time period to a storage device associated with the computer; and in response to receiving a task-recovery request from the user after the user has suspended a second task, presenting, on a display associated with the computer, a visual representation associated with at least the first task based on the transferred portion of the activity information to the user.

8. The computer-readable storage medium of claim 7, wherein the method further comprises extracting a sequence of events during the predetermined time period before the interruption.

9. The computer-readable storage medium of claim 8, wherein the visual representation comprises a replay of the sequence of events.

10. The computer-readable storage medium of claim 7, wherein recording the information associated with the user's activities involves buffering the recorded user activity information in a temporary buffer with a predetermined depth, thereby allowing newly recorded user activity information to dequeue previously recorded user activities.

11. The computer-readable storage medium of claim 7, wherein presenting the visual representation associated with at least the first task includes presenting a series of screenshots, thereby illustrating the user's activities during the predetermined time period.

12. The computer-readable storage medium of claim 11, wherein the method further comprises allowing the user to define a granularity of the screenshots.

13. A computer system for assisting a user in recovering from a task interruption, the computer system comprising:
a processor; and
a storage device coupled to the processor and storing instructions which when executed by the processor cause the processor to perform a method, the method comprising:

recording, by one or more sensors associated with the computer system, information associated with the user's activities while the user is performing a task;

in response to determining that the user has suspended a first task, transferring a portion of the recorded user activity information corresponding to a predetermined time period to a second storage device associated with the computer system; and in response to receiving a task-recovery request from the user after the user has suspended a second task, presenting, on a display associated with the computer system, a visual representation associated with at least the first task based on the transferred portion of the activity information to the user.

14. The computer system of claim 13, wherein the method further comprises extracting a sequence of events during the predetermined time period.

15. The computer system of claim 14, wherein the visual representation comprises a replay of the sequence of events.

16. The computer system of claim 13, wherein recording the information associated with the user's activities involves buffering the recorded user activity information in a temporary buffer having a predetermined depth, thereby allowing newly recorded user activity information to dequeue previously recorded user activity information.

17. The computer system of claim 13, wherein presenting the visual representation associated with at least the first task includes presenting a series of screenshots, thereby illustrating the user's activities.

18. The computer system of claim 17, wherein the method further comprises allowing the user to define a granularity of the screenshots.

19. The computer system of claim 13, wherein the method further comprises presenting a graphical user interface (GUI) toolbar on the display to allow the user to launch the visual representation.

* * * * *